(12) United States Patent
Robins et al.

(10) Patent No.: US 9,272,495 B1
(45) Date of Patent: Mar. 1, 2016

(54) COMPACTION SYSTEM FOR COMPOSITE STRINGERS

(71) Applicants: Brian G. Robins, Renton, WA (US); Kurtis S. Willden, Kent, WA (US); Daniel M. Rotter, Lake Forest Park, WA (US); Brad A. Coxon, Everett, WA (US)

(72) Inventors: Brian G. Robins, Renton, WA (US); Kurtis S. Willden, Kent, WA (US); Daniel M. Rotter, Lake Forest Park, WA (US); Brad A. Coxon, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 528 days.

(21) Appl. No.: 13/626,452

(22) Filed: Sep. 25, 2012

(51) Int. Cl.
| | |
|---|---|
| B29C 65/00 | (2006.01) |
| B32B 37/00 | (2006.01) |
| B32B 37/10 | (2006.01) |
| B64C 1/00 | (2006.01) |
| B64C 1/06 | (2006.01) |
| B64C 3/00 | (2006.01) |
| B64C 3/18 | (2006.01) |
| B64C 3/24 | (2006.01) |
| B64C 3/26 | (2006.01) |
| B64C 3/30 | (2006.01) |
| B64C 3/28 | (2006.01) |

(52) U.S. Cl.
CPC ............ *B32B 37/1018* (2013.01); *B29C 65/00* (2013.01); *B32B 37/0046* (2013.01); *B32B 37/10* (2013.01); *B64C 1/00* (2013.01); *B64C 3/18* (2013.01); *B29C 66/00145* (2013.01); *B32B 37/00* (2013.01); *B64C 1/06* (2013.01); *B64C 1/061* (2013.01); *B64C 1/064* (2013.01); *B64C 1/068* (2013.01); *B64C 1/069* (2013.01); *B64C 3/182* (2013.01); *B64C 3/24* (2013.01); *B64C 3/26* (2013.01); *B64C 3/28* (2013.01); *B64C 3/30* (2013.01)

(58) Field of Classification Search
CPC .. B29C 65/00; B29C 66/00145; B32B 37/00; B32B 37/10; B64C 1/00; B64C 1/06; B64C 1/061; B64C 1/064; B64C 1/068; B64C 1/069; B64C 3/18; B64C 3/182; B64C 3/24; B64C 3/26; B64C 3/28; B64C 3/30
See application file for complete search history.

(56) References Cited

U.S. PATENT DOCUMENTS

| | | | | |
|---|---|---|---|---|
| 6,017,484 | A * | 1/2000 | Hale | 264/510 |
| 2009/0320292 | A1 | 12/2009 | Brennan et al. | |
| 2010/0151162 | A1* | 6/2010 | Dorawa et al. | 428/34.1 |
| 2010/0196637 | A1* | 8/2010 | Lippert et al. | 428/36.1 |
| 2012/0076989 | A1 | 3/2012 | Bland | |

* cited by examiner

*Primary Examiner* — Michael N Orlando
*Assistant Examiner* — Matthew Hoover
(74) *Attorney, Agent, or Firm* — Yee & Associates, P.C.

(57) ABSTRACT

A method and apparatus for compacting composite stringers. In one illustrative embodiment, an apparatus comprises a compacting structure, a compactor vacuum system, and a carrier vacuum system. The compacting structure has a shape configured to contact layers of uncured composite material for a composite stringer. The compactor vacuum system is associated with the compacting structure. The compactor vacuum system is configured to cause the compacting structure to apply a pressure to the layers of uncured composite material when a compactor vacuum is applied to the compactor vacuum system. The carrier vacuum system is associated with the compacting structure. The carrier vacuum system is configured to hold the layers of uncured composite material against the compacting structure when a carrier vacuum is applied to the carrier vacuum system.

11 Claims, 17 Drawing Sheets

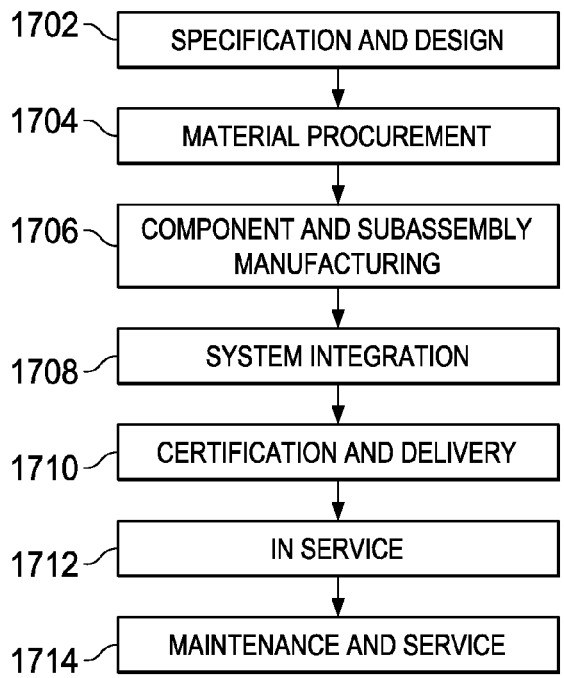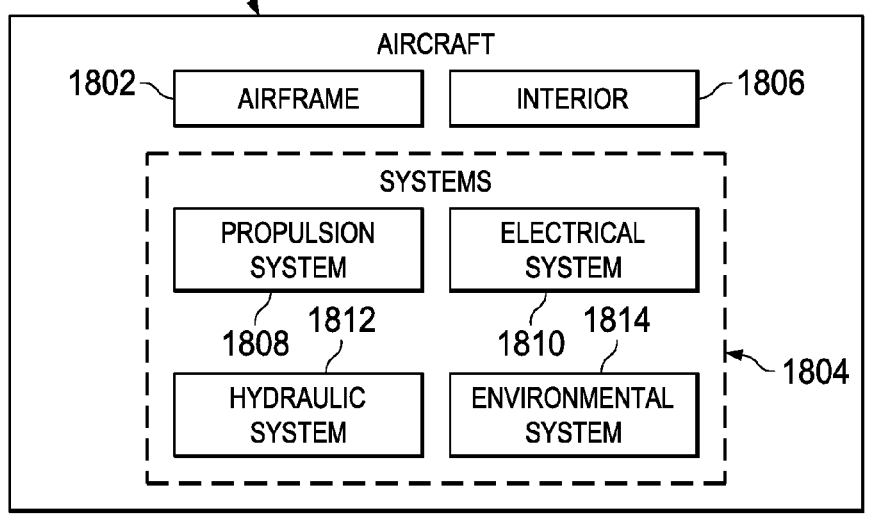

COMPACTION SYSTEM FOR COMPOSITE STRINGERS

BACKGROUND INFORMATION

1. Field

The present disclosure relates generally to aircraft and, in particular, to forming stringers in an aircraft. Still more particularly, the present disclosure relates to a method and apparatus for compacting layers of uncured composite material for a composite stringer.

2. Background

Aircraft are being designed and manufactured with ever increasing percentages of composite materials. Composite materials are used in aircraft to decrease the weight of the aircraft. This decreased weight improves performance features such as payload capacity and fuel efficiency. Further, composite materials provide longer service life for various components in an aircraft.

Composite materials may be tough, light-weight materials created by combining two or more functional components. For example, a composite material may include reinforcing fibers bound in a polymer resin matrix. The fibers may be unidirectional or may take the form of a woven cloth or fabric. The fibers and resins may be arranged and cured to form a composite structure.

Using composite materials to create aerospace composite structures may allow for portions of an aircraft to be manufactured in larger pieces or sections. For example, a fuselage of an aircraft may be created in cylindrical sections to form the fuselage of the aircraft. Other examples include, without limitation, wing sections joined together to form a wing or stabilizer sections joined together to form a stabilizer.

In manufacturing composite structures, layers of uncured composite material may be laid up on a tool. The layers of uncured composite material may be comprised of fibers in sheets. These sheets may take the form of, for example, without limitation, fabrics, tape, tows, or other suitable configurations for the sheets. In some cases, resin may be infused or pre-impregnated into the sheets. These types of sheets are commonly referred to as prepreg.

The different layers of prepreg may be laid up in different orientations and different numbers of layers of uncured composite material may be used depending on the desired thickness of the composite structure being manufactured. These layers of uncured composite material may be laid up by hand or by using automated lamination equipment such as a tape laminating machine or a fiber placement system.

Laying up layers of uncured composite material to form different structures in an aircraft may be a complex and time-consuming task. For example, a section of a fuselage includes laying up layers of uncured composite material for the walls of the fuselage.

Additionally, other features may be laid up or placed onto these layers for curing at the same time. For example, stringers on the interior walls of the fuselage may be laid up along with the walls for the fuselage itself. For example, layers of uncured composite material in the form of a stringer may be laid up on a tool. This tool may be an inner-mold line (IML) tool when the stringer is laid up with other structures to form a composite structure. In other illustrative examples, the tool may be used only for compacting the stringers. These layers may be compacted after being placed on the tool. A compacting device is used to hold the shape of the stringer and compact the stringers before curing the stringers with the other layers of uncured composite material for the wall of the fuselage.

These compacting devices may take various forms. For example, a bladder, a mandrel, or some other suitable device may be placed against the inner wall of the stringer. After the stringers have been placed on the IML tool, a vacuum bag may be placed over the stringers. A vacuum may then be applied to the vacuum bag to compact the layers of uncured composite material for the stringers. When a vacuum is applied, air and other gases in the vacuum bag are drawn out of the vacuum bag.

The stringers are often compacted in batches. In other words, stringers awaiting other stringers to be placed on the IML tool are not compacted until the additional stringers in another batch are ready. The stringers awaiting processing may change from the desired shape or shift forms before compactions occur for the batch of stringers.

Additionally, the process of installing the vacuum bag and applying the vacuum is a labor-intensive job performed by operators. The vacuum bag is placed over the stringers. The edges of the vacuum bag are sealed. Thereafter, a vacuum is drawn in the vacuum bag such that pressure is applied on the compacting devices in the stringers.

The vacuum may be drawn for various periods of time. For example, the compaction may require about thirty minutes. During this time, the operators and other processes in forming the fuselage section are put on hold. After the stringers have been compacted, the vacuum bag is removed and the compaction devices are also removed from the stringers. Thereafter, any additional layers of uncured composite material may be laid up on the tool for curing. Thereafter, the fuselage section and the stringers may be cured to form the fuselage section.

This process is complex and time-consuming. The complexity and time needed to perform these operations may result in taking more time than desired to form a composite fuselage section for an aircraft. Therefore, it would be desirable to have a method and apparatus that takes into account at least some of the issues discussed above, as well as other possible issues.

SUMMARY

In one illustrative embodiment, an apparatus comprises a compacting structure, a compactor vacuum system, and a carrier vacuum system. The compacting structure has a shape configured to contact layers of uncured composite material for a composite stringer. The compactor vacuum system is associated with the compacting structure. The compactor vacuum system is configured to cause the compacting structure to apply a pressure to the layers of uncured composite material when a compactor vacuum is applied to the compactor vacuum system. The carrier vacuum system is also associated with the compacting structure. The carrier vacuum system is configured to hold the layers of uncured composite material against the compacting structure when a carrier vacuum is applied to the carrier vacuum system.

In another illustrative embodiment, an apparatus comprises a compacting structure and a compactor vacuum system. The compacting structure has a shape configured to contact an internal wall of layers of uncured composite material for a composite stringer. The compactor vacuum system is configured to cause the compacting structure to apply a pressure to the layers of uncured composite material when a compactor vacuum is applied to the compactor vacuum system.

In yet another illustrative embodiment, a method is present for processing a composite stringer. Layers of uncured composite material for a composite stringer are placed onto a tool.

A compactor vacuum is applied to a compactor vacuum system associated with a compacting structure such that the layers of uncured composite material of the composite stringer are compacted against the tool.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 17 is an illustration of an aircraft manufacturing and service method in accordance with an illustrative embodiment; and FIG. 18 is an illustration of an aircraft in which an illustrative embodiment may be implemented.

DETAILED DESCRIPTION

The illustrative embodiments recognize and take into account one or more different considerations. For example, the illustrative embodiments recognize and take into account that currently, the process of compacting stringers on a mold is not performed until a plurality or possibly all of the stringers have been put in place. In some cases, some portion of the stringers may be put in place before the compacting occurs. The time needed to place the stringers while concurrently installing the vacuum bag to compact the stringers may take more time than desired.

Therefore, the illustrative embodiments recognize and take into account that it may be desirable to employ a system that allows for each stringer to be compacted individually. Thus, the illustrative embodiments recognize and take into account that with this type of system, each stringer may be compacted immediately after installation without waiting for the installation of other stringers. As a result, each stringer is compacting and moving forward in the process while other stringers are being installed. Further, the illustrative embodiments recognize and take into account that it would be desirable to have a compacting system that reduces the amount of time and complexity that is currently needed with currently used vacuum bags.

Thus, the illustrative embodiments provide a method and apparatus for processing a stringer. In one illustrative embodiment, an apparatus includes a compacting structure and a compactor vacuum system. The compacting structure has a shape configured to contact an internal wall of layers of uncured composite material for a composite stringer. The vacuum system is associated with the compacting structure. The vacuum system is configured to cause the compacting structure to apply pressure to the layers of uncured composite material when a vacuum is applied to the vacuum system.

Additionally, a carrier vacuum system also may be present that is associated with a compacting structure. The carrier vacuum system is configured to hold the layers of uncured composite material against the compacting structure when a carrier vacuum is applied to the carrier vacuum system. This carrier vacuum system provides a mechanism for aiding in the transportation, adherence, and compaction of the layers of uncured composite material into stringer channels in the tool.

Figure 1:
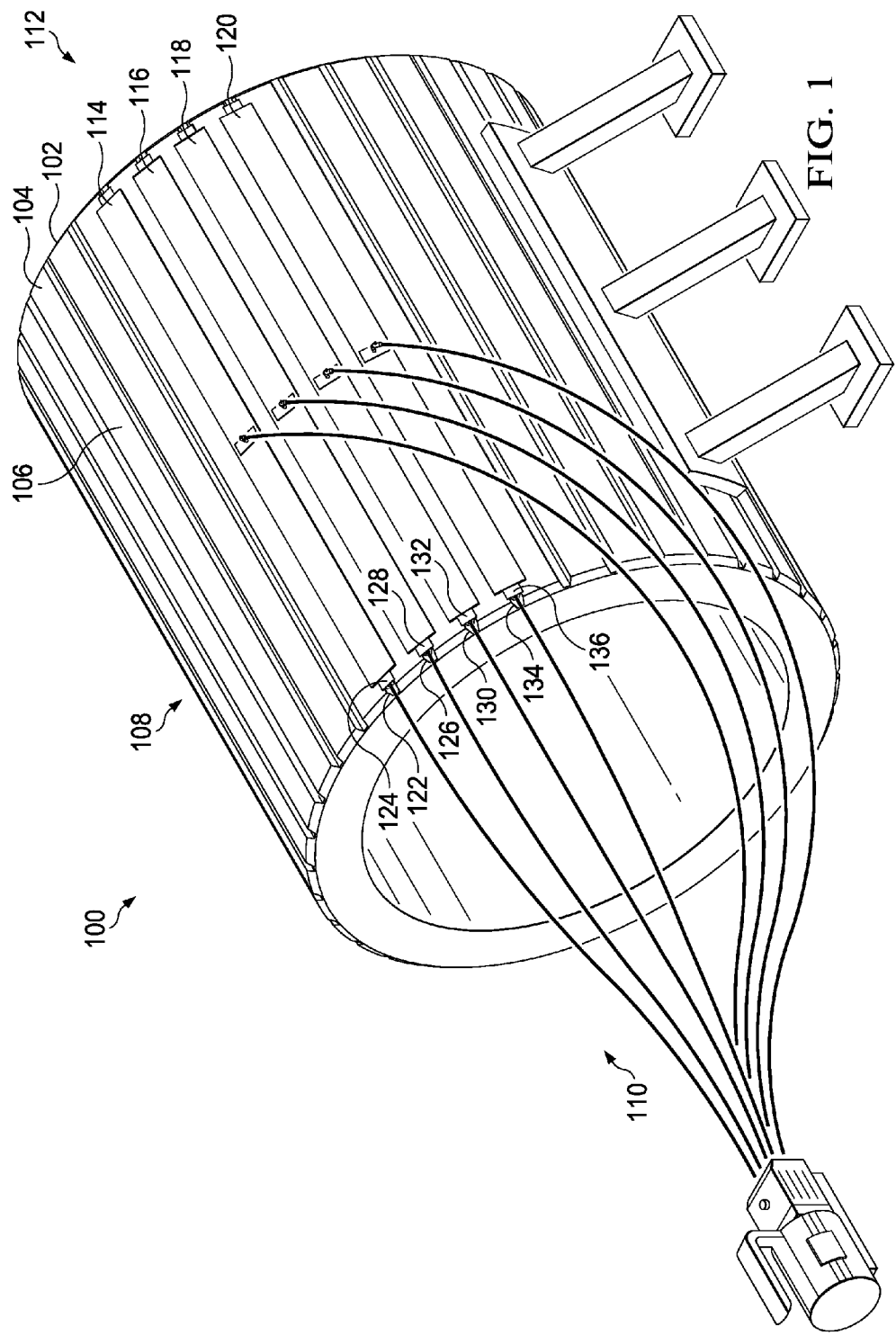
FIG. 1 is an illustration of a composite manufacturing environment in accordance with an illustrative embodiment.

With reference now to the figures, and in particular, with reference to FIG. 1, an illustration of a composite manufacturing environment is depicted in accordance with an illustrative embodiment. In this depicted example, composite manufacturing environment 100 is used to manufacture fuselage sections. As depicted, mold 102 may be inner-mold line (IML) tool 104. In other words, layers of uncured composite material may be laid up on outer surface 106 of mold 102.

In these illustrative examples, openings 108 are present on outer surface 106 of mold 102. Openings 108 are openings in which layers of uncured composite material for stringers may be placed on mold 102.

In these illustrative examples, mold 102 may be a mold used for compacting stringer preforms. In these illustrative examples, a stringer preform is comprised of layers of uncured composite material for a composite stringer. Each of the stringer preforms is placed in one of openings 108 for processing.

In other words, mold 102 is not the mold on which layers of uncured composite material are laid up to form walls for the fuselage. In this implementation, after the stringer preforms are compacted, the stringer preforms are removed and placed on another tool on which layers of uncured composite material may be laid up to form the walls of the fuselage. In other illustrative examples, IML tool 104 may be a mold on which layers of uncured composite material are also laid up for the walls of the fuselage section.

In these illustrative examples, stringer processing system 110 may be used to place and to compact layers of uncured composite material for composite stringers. In this illustrative example, stringer processing system 110 comprises stringer processing devices 112. In particular, stringer processing devices 112 include stringer processing device 114, stringer processing device 116, stringer processing device 118, and stringer processing device 120. Stringer processing device 114 is located in channel 122 with stringer preform 124. Stringer processing device 116 is located in channel 126 with stringer preform 128. Stringer processing device 118 is located in channel 130 with stringer preform 132. Stringer processing device 120 is located in channel 134 with stringer preform 136.

In these illustrative examples, stringer processing devices 112 are used in place of a traditional vacuum bag. As a result, each time a stringer processing device is placed into a channel, the compacting of the stringer preform may begin at that time without waiting for the installation of other stringer preforms into other openings. For example, when stringer preform 124 is placed in channel 122 with stringer processing device 114, stringer processing device 114 may begin to compact stringer preform 124. Thereafter, when stringer preform 128 is placed into channel 126 with stringer processing device 116, stringer processing device 116 may begin compacting stringer preform 128. In a similar fashion, when stringer preform 132 is placed into channel 130 with stringer processing device 118, the compacting of stringer preform 132 may begin at that time without waiting for stringer preform 136 to be placed in channel 134.

In this manner, the compacting of stringers may be performed individually rather than in larger groups as currently performed. In this manner, a reduced amount of time may be present prior to placing other stringers onto mold 102. Further, with the use of stringer processing system 110, stringer preforms may be placed into openings 108 in almost any orientation. As a result, less rotation or movement of IML tool 104 may be needed to install and compact stringers into openings 108.

The illustration of composite manufacturing environment 100 is not meant to imply limitations to the manner in which other composite manufacturing environments may be implemented. In this illustrative example, other numbers of stringer processing devices may already be installed onto mold 102 other than the ones depicted.

Figure 2:
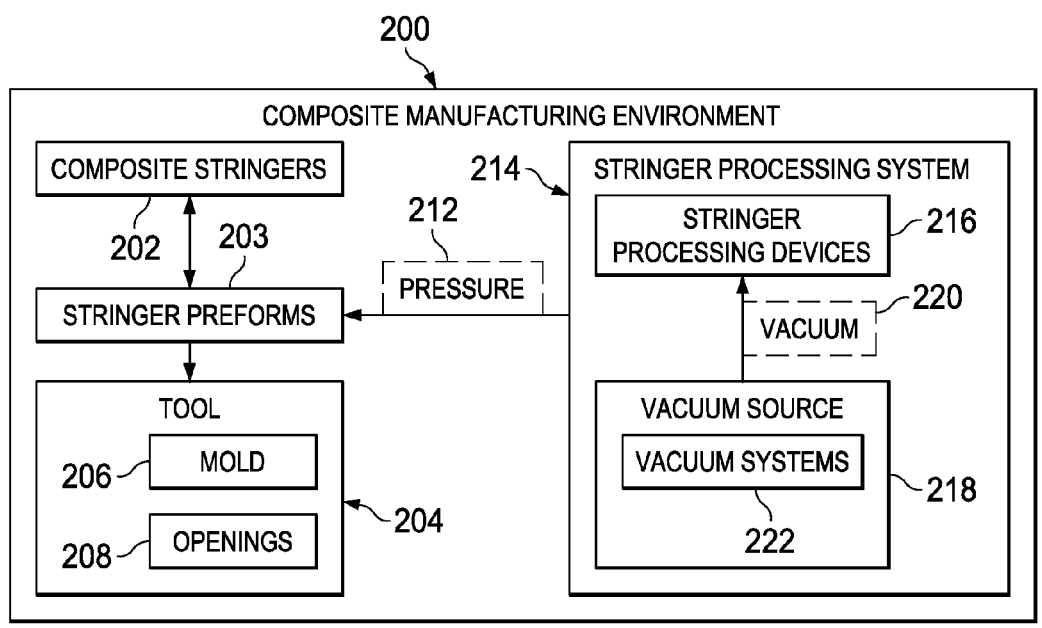
FIG. 2 is an illustration of a block diagram of a composite manufacturing environment in accordance with an illustrative embodiment.

Turning now to FIG. 2, an illustration of a block diagram of a composite manufacturing environment is depicted in accordance with an illustrative embodiment. As depicted, composite manufacturing environment 100 is an example of one implementation for composite manufacturing environment 200 in FIG. 2.

In this illustrative example, composite manufacturing environment 200 may be used to process composite stringers 202. In these illustrative examples, stringer preforms 203 for composite stringers 202 may be placed onto tool 204 for processing. In this illustrative example, tool 204 takes the form of mold 206. Mold 206 has openings 208 in which composite stringers 202 may be processed.

Mold 206 may be configured only for processing stringer preforms 203 for composite stringers 202. In other words, after stringer preforms 203 are processed, stringer preforms 203 may be moved to a second mold in which additional layers of uncured composite material may be laid up on stringer preforms 203 to form a structure such as a fuselage section. That second mold with the additional layers of uncured composite material and stringer preforms may then be cured to form the fuselage section with the composite stringers. In other illustrative examples, mold 206 may be the mold on which the additional layers of uncured composite material are laid up for the fuselage section and cured. In still other illustrative examples, all of the layers of uncured composite material to form composite stringers 202 may be laid up at once.

In these illustrative examples, stringer preforms 203 for composite stringers 202 are placed into openings 208 on tool 204. Stringer preforms 203 may be compacted on mold 206 using stringer processing system 110 from FIG. 1. In these illustrative examples, compacting involves applying pressure 212 onto stringer preforms 203. Pressure 212 is a force applied to stringer preforms 203 in these illustrative examples. Pressure 212 is applied such that inconsistencies in composite stringers 202 manufactured from stringer preforms 203 may be reduced.

Stringer processing system 214 is comprised of stringer processing devices 216. Each of stringer processing devices 216 is associated with a stringer preform in stringer preforms 203. Stringer processing devices 216 in stringer processing system 214 are configured to apply pressure 212 to stringer preforms 203.

Pressure 212 is applied individually to stringer preforms 203 by stringer processing devices 216. In other words, each of stringer processing devices 216 may apply pressure 212 to a stringer preform in stringer preforms 203.

As depicted, pressure 212 is applied to stringer preforms 203 when vacuum source 218 applies vacuum 220 to stringer processing devices 216. Vacuum source 218 may apply vacuum 220 independently to stringer processing devices 216. In other words, vacuum 220 may be applied to one stringer processing device in stringer processing devices 216 while vacuum 220 is not applied to another stringer processing device in stringer processing devices 216.

Vacuum source 218 may be comprised of a number of vacuum systems 222. As used herein, a "number of" when used with reference to items means one or more items. For example, a number of vacuum systems 222 is one or more vacuum systems 222. In other words, vacuum source 218 may have more than one vacuum system configured to apply vacuum 220 to stringer processing devices 216.

Figure 3:
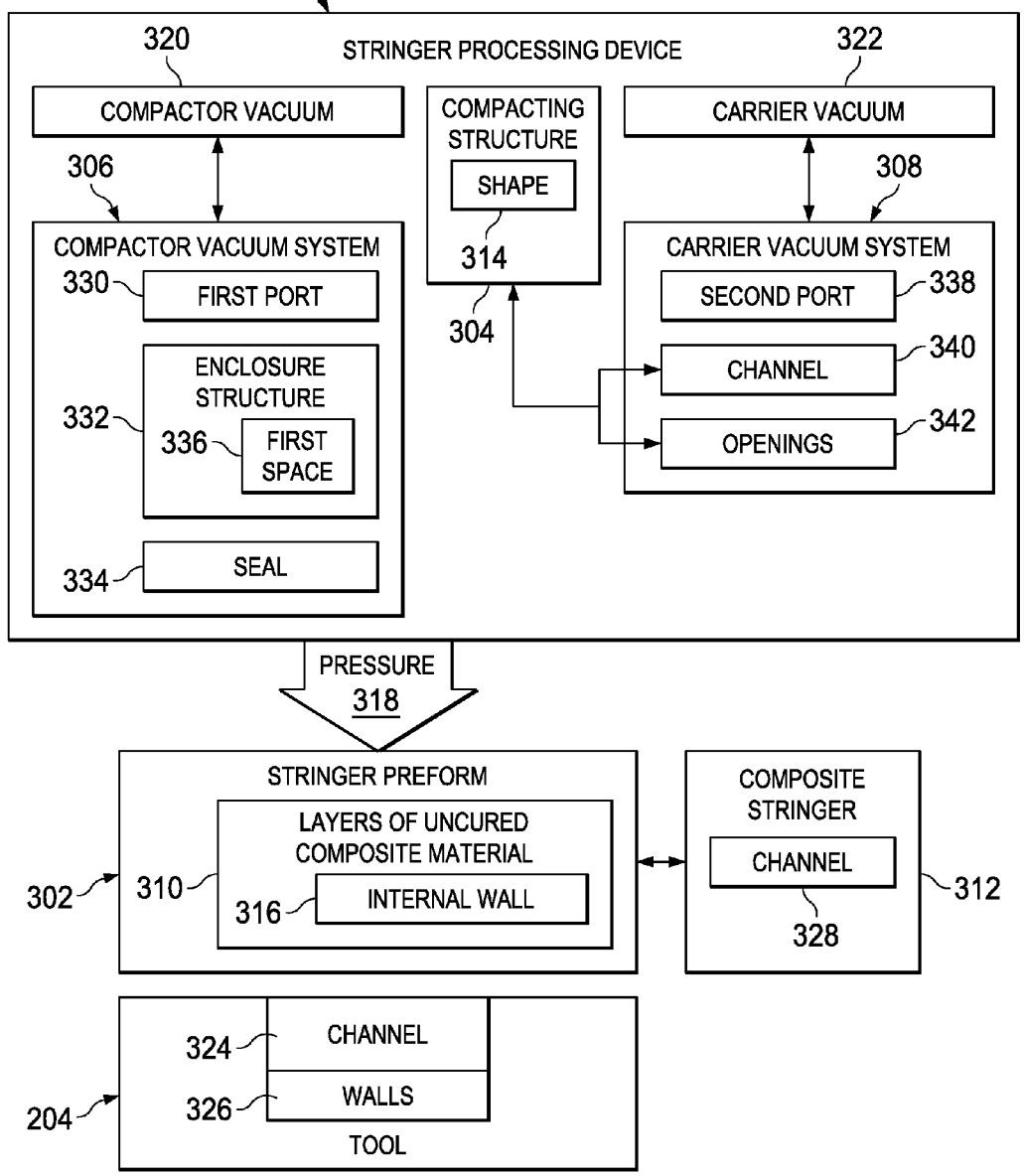
FIG. 3 is an illustration of a block diagram of a stringer processing device for processing a stringer in accordance with an illustrative embodiment.

Turning now to FIG. 3, an illustration of a block diagram of a stringer processing device for processing a stringer is depicted in accordance with an illustrative embodiment. In this illustrative example, stringer processing device 300 may be used to process stringer preform 302.

As depicted, stringer processing device 300 is an example of a stringer processing device in stringer processing devices 216 in FIG. 2. Stringer preform 302 is an example of a stringer preform in stringer preforms 203 in FIG. 2.

In this illustrative example, stringer processing device 300 comprises compacting structure 304, compactor vacuum system 306, and carrier vacuum system 308. Stringer preform 302 is comprised of layers of uncured composite material 310 for composite stringer 312. Composite stringer 312 is an example of a composite stringer in composite stringers 202 in FIG. 2.

In this illustrative example, compacting structure 304 has shape 314. Shape 314 of compacting structure 304 is configured to contact internal wall 316 of layers of uncured composite material 310 for composite stringer 312. Internal wall 316 is a wall in channel 328 in composite stringer 312. In other words, shape 314 of compacting structure 304 corresponds to channel 328 in an interior of composite stringer 312.

Compacting structure 304 may be comprised of a number of different materials. For example, compacting structure 304 may be comprised of a number of materials selected from at least one of a plastic, graphite, aluminum, a polycarbonate, wood, a composite material, a thermoplastic material, and some other suitable materials. In these illustrative examples, the material may be a material selected that allows for a vacuum to be drawn through, around, or both through and around compacting structure 304.

The selection of the material for compacting structure 304 also may be based on the ability of the material to provide a level of stiffness that does not deform in an undesirable manner when a vacuum, such as compactor vacuum 320 and carrier vacuum 322 are applied. The material for compacting structure 304 also may be selected to provide compliancy such that pressure 318 may be applied to all areas of stringer preform 302 contacted by compacting structure 304.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C or item B and item C.

Compactor vacuum system 306 is associated with compacting structure 304. When one component is "associated" with another component, the association is a physical association in the depicted examples. For example, a first component, compacting structure 304, may be considered to be associated with a second component, compactor vacuum system 306, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

In these illustrative examples, vacuum source 218 in FIG. 2 may apply vacuum 220 to stringer processing device 300. Vacuum source 218 is configured to independently apply vacuum 220 to compactor vacuum system 306 and carrier vacuum system 308. In particular, vacuum 220 may include compactor vacuum 320 and carrier vacuum 322.

Compactor vacuum system 306 is configured to cause compacting structure 304 to apply pressure 318 to layers of uncured composite material 310 when compactor vacuum 320 is applied to compactor vacuum system 306. As depicted, pressure 318 may be applied to layers of uncured composite material 310 when layers of uncured composite material 310 in stringer preform 302 for composite stringer 312 are placed into channel 324 of tool 204.

In other words, carrier vacuum system 308 may be used to hold layers of uncured composite material 310 in the shape of stringer perform 302 during transport and installation of layers of uncured composite material 310. After placing compacting structure 304 with layers of uncured composite material 310 into tool 204, carrier vacuum 322 may be released from carrier vacuum system 308. When carrier vacuum system 308 is turned off, compactor vacuum system 306 may be turned on in these illustrative examples.

In the illustrative examples, carrier vacuum system 308 may be turned off prior to compactor vacuum system 306 being turned on. Further, carrier vacuum system 308 may be turned off after compactor vacuum system 306 is turned on. In other illustrative examples, carrier vacuum system 308 may be turned off at substantially the same time that compactor vacuum system 306 is turned on.

In this illustrative example, layers of uncured composite material 310 are located between compacting structure 304 and walls 326 in channel 324 of tool 204. Pressure 318 is applied to layers of uncured composite material 310 by the movement of compacting structure 304 towards walls 326 of tool 204.

In this illustrative example, compactor vacuum system 306 may comprise first port 330, enclosure structure 332, and seal 334. First port 330 provides a connection to enclosure structure 332 and to a vacuum source that applies compactor vacuum 320.

Enclosure structure 332 is configured to define first space 336 through which compactor vacuum 320 may be applied. Enclosure structure 332 is associated with compacting structure 304 such that compactor vacuum 320 causes pressure 318.

Enclosure structure 332 may be comprised of a number of different materials. For example, enclosure structure 332 may be comprised of a number of materials selected from at least one of plastic, a closed-cell foam, polyurethane, silicone, vinyl, and other suitable materials.

Seal 334 is associated with enclosure structure 332. In these illustrative examples, seal 334 is associated with enclosure structure 332 such that a vacuum may be applied within first space 336 when enclosure structure 332 is placed on layers of uncured composite material 310 in stringer preform 302.

Seal 334 may be comprised of a number of different materials. Further, seal 334 may be comprised of any material that allows for first vacuum 320 to be applied to compactor vacuum system 306. For example, seal 334 may be comprised of a material selected from at least one of a synthetic rubber, a thermoplastic elastomer, polyurethane, butyl rubber, and other suitable materials.

Seal 334 does not need to be an airtight seal in all cases. The seal provided by seal 334 may be sufficient such that pressure 318 may be generated by compacting structure 304 when compactor vacuum 320 is applied to compactor vacuum system 306. Further, seal 334 may be selected from a material that does not cause contamination to layers of uncured composite material 310 in stringer preform 302 that come into contact with seal 334.

In this illustrative example, carrier vacuum system 308 comprises second port 338 and channel 340. Channel 340 extends through compacting structure 304 in this illustrative example. Second port 338 provides a connection between channel 340 and a vacuum source that applies carrier vacuum 322. Openings 342 are present and are also part of carrier vacuum system 308 in compacting structure 304. Openings 342 provide communication between channel 340 and the exterior of compacting structure 304.

When carrier vacuum 322 is applied and compacting structure 304 is placed against layers of uncured composite material 310, layers of uncured composite material 310 may be held against tool 204.

As depicted, carrier vacuum system 308 is associated with tool 204. Carrier vacuum system 308 is configured to hold layers of uncured composite material 310 against tool 204 when carrier vacuum 322 is applied to carrier vacuum system 308.

In these illustrative examples, carrier vacuum system 308 with carrier vacuum 322 may press layers of uncured composite material 310 against tool 204 to lay up the layers of uncured composite material on tool 204. As a result, layers of uncured composite material 310 may be pressed against channel 324 and walls 326 in tool 204.

In this manner, stringer processing device 300 may also move stringer preform 302 to the desired location. Additionally, stringer processing device 300 may be used to move stringer preform 302 after being compacted to another location such as a mold used for curing depending on the particular implementation.

The illustration of composite manufacturing environment 200 and the different components in FIGS. 2 and 3 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although both compactor vacuum system 306 and carrier vacuum system 308 are present in stringer processing device 300 in the illustrative example, both vacuum systems may not be needed. For example, stringer processing device 300 may only include compactor vacuum system 306.

As another example, carrier vacuum system 308 is shown as a separate block from compacting structure 304 in FIG. 3. In other illustrative examples, carrier vacuum system 308 may include compacting structure 304 even though they are shown as different components.

In still another illustrative example, enclosed structure 332 may not always define first space 336. In some cases, enclosed structure 332 may include openings, holes, or other paths through which a vacuum may be drawn to cause compacting structure 304 to apply pressure 318 to layers of uncured composite material 310 without needing first space 336.

In these illustrative examples, enclosed structure 332 may take different forms. For example, without limitation, enclosure structure 332 may be enclosed structure 332 may be selected from one of a vacuum bag, a flexible structure with a seal, and other suitable structures.

In the illustrative examples, only a single port is illustrated for each of the vacuum systems. In other implementations, one or more additional ports may be present in addition to first port 330, second port 338, or both.

In yet another illustrative example, stringer processing device 300 may have a shape that corresponds to the shape of tool 204. For example, if tool 204 has a curved shape, stringer processing device 300 may also have a shape that is configured to conform to the curve of tool 204.

In still other illustrative examples, stringer processing device 300 may be flexible in shape. The materials may be selected such that the different components in stringer processing device 300 may bend to have a shape that corresponds to the shape of tool 204. In other words, if channel 324 has a curve or bend, stringer processing device 300 may bend to conform to the curve or bend in channel 324.

Further, in some illustrative examples, the design of the components in stringer processing device 300 may allow for bending of stringer processing device 300 to correspond to a shape of tool 204. This bending may occur about an axis of stringer processing device 300. For example, bending of the components in stringer processing device 300 may occur about the longitudinal axis. In other illustrative examples, a twisting may also occur about an axis of stringer processing device 300.

Figure 4:
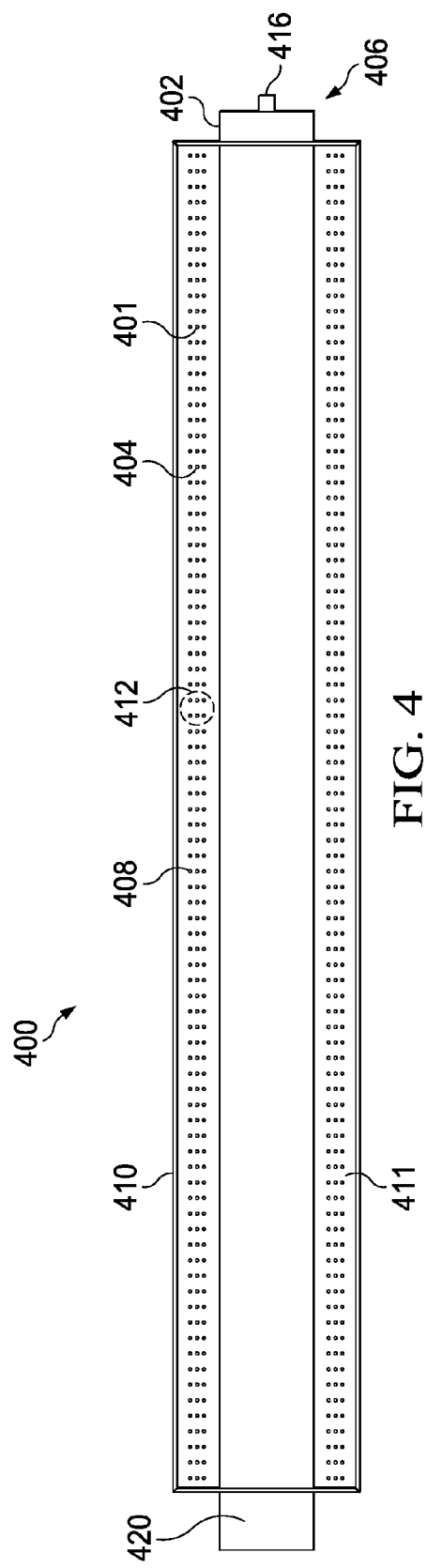
FIG. 4 is an illustration of a stringer processing device in accordance with an illustrative embodiment.

Turning now to FIG. 4, an illustration of a stringer processing device is depicted in accordance with an illustrative embodiment. In this illustrative example, a view of stringer processing device 400 is shown. In this example, FIG. 4 illustrates a view of stringer processing device 400 from side 401 of stringer processing device 400. Stringer processing device 400 is an example of one implementation of stringer processing device 300 shown in block form in FIG. 3 and is an example of a stringer processing device that may be used in stringer processing devices 112 in FIG. 1.

Side 401 may be considered a top side of stringer processing device 400. In other words, side 401 may face away from the surface of the mold.

As depicted, stringer processing device 400 includes compacting structure 402, compactor vacuum system 404, and carrier vacuum system 406. These components in stringer processing device 400 may be used to process a stringer preform for a composite stringer. Compacting structure 402 is configured to contact layers of uncured composite material in the stringer perform for the composite stringer.

Compactor vacuum system 404 is comprised of enclosure structure 408, seal 410, and first port 412. Enclosure structure 408 is configured to define a space. This space is an enclosed space when seal 410 is placed against layers of uncured composite material for a stringer preform.

In this illustrative example, enclosure structure 408 may be comprised of a sheet of flexible material. This material may be the same material used for vacuum bags. As depicted, enclosure structure 408 is substantially transparent in this illustrative example.

Seal 410 is located at the periphery 411 of enclosure structure 408. Seal 410 is configured to create a seal such that a vacuum may be applied to the enclosed space. In this illustrative example, enclosure structure 408 covers side 420 of compacting structure 402.

As depicted, compactor vacuum system 404 is configured to cause compacting structure 402 to apply pressure to the layers of uncured composite material when placed against IML tool. This pressure may be applied when a vacuum is applied to compactor vacuum system 404 through first port 412.

In this view, second port 416 is seen. Second port 416 is a port for carrier vacuum system 406.

Figure 5:
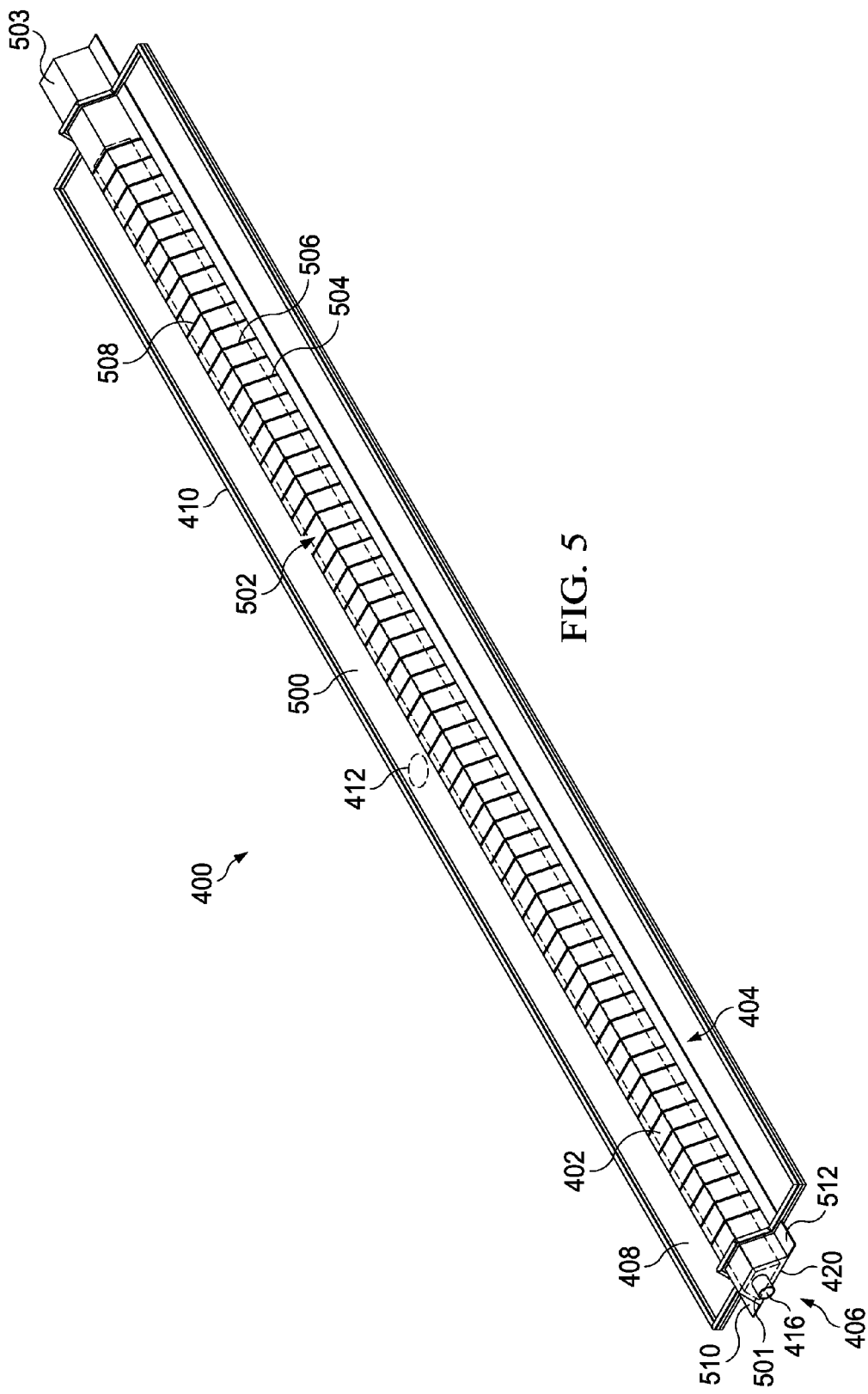
FIG. 5 is an illustration of an isometric view of a stringer processing device in accordance with an illustrative embodiment.

Turning now to FIG. 5, an illustration of an isometric view of a stringer processing device is depicted in accordance with an illustrative embodiment. In this illustrative view, side 500 of stringer processing device 400 is shown.

In this view, additional components in carrier vacuum system 406 are shown. As depicted, channel 501 is shown in phantom extending through the interior of compacting structure 402. Openings 502 are shown on side 503 of compacting structure 402. Openings 502 are in communication with channel 501 within the interior of compacting structure 402. Opening 504, opening 506, and opening 508 are examples of some openings in openings 502 in compacting structure 402.

In this view, flange 510 and flange 512 are shown on compacting structure 402. Flange 510 and flange 512 may aid in applying pressure against a stringer preform.

Figure 6:
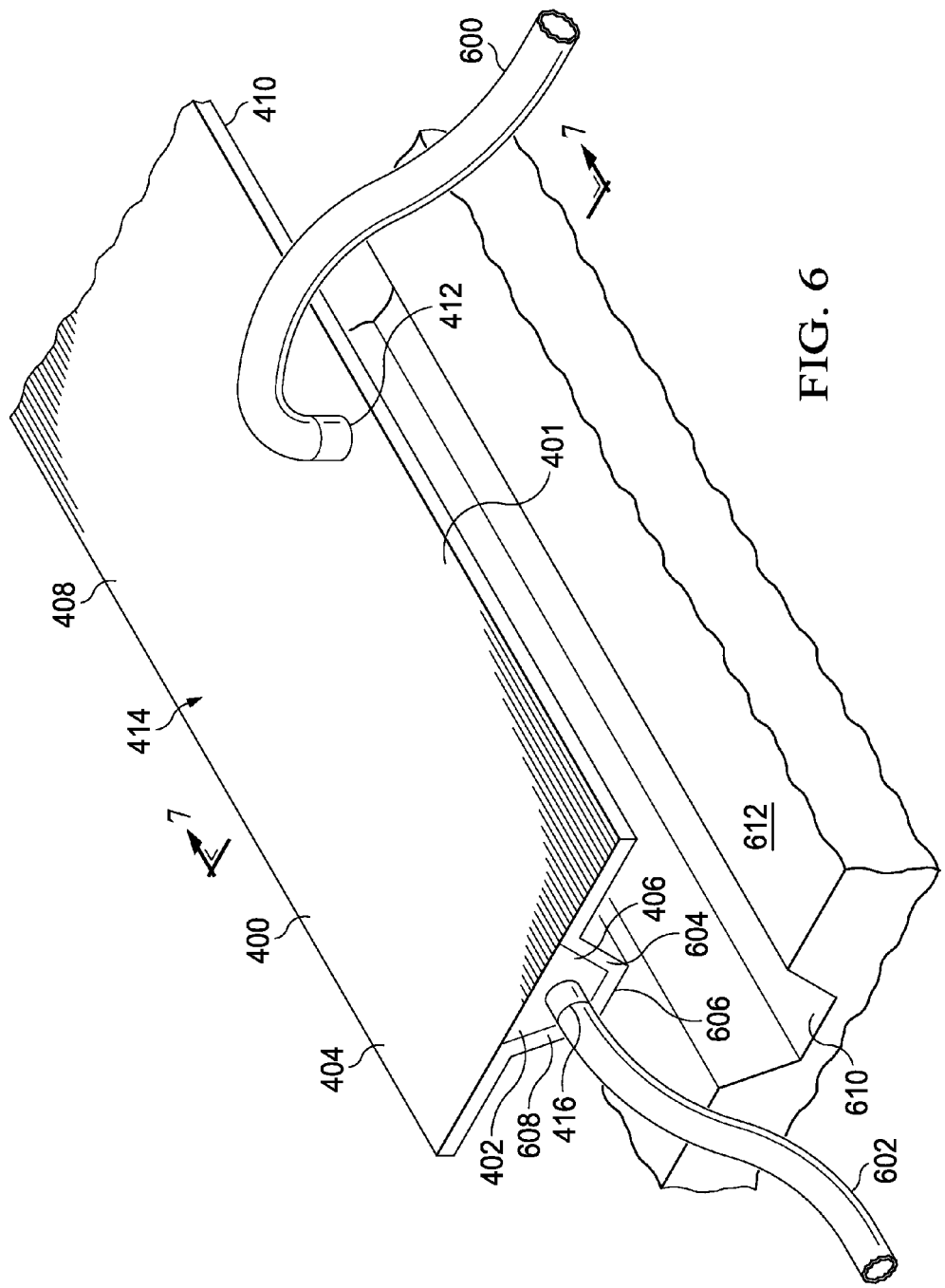
FIG. 6 is an illustration of a stringer processing device with a stringer preform positioned relative to a tool in accordance with an illustrative embodiment.

With reference now to FIG. 6, an illustration of a stringer processing device with a stringer preform positioned relative to a tool is depicted in accordance with an illustrative embodiment. First port 412 in compactor vacuum system 404 is connected to a vacuum source by hose 600. As depicted, second port 416 in carrier vacuum system 406 is connected to a vacuum source by hose 602.

As illustrated, layers of uncured composite material 604 for stringer preform 606 are held by stringer processing device 400. In particular, layers of uncured composite material 604 for stringer preform 606 are held against surface 608 of compacting structure 402 with a vacuum applied to carrier vacuum system 406 through second port 416, channel 501, and through openings 502 in FIG. 5.

As depicted, stringer processing device 400 with layers of uncured composite material 604 for stringer preform 606 are positioned relative to channel 610 of tool 612.

Figure 7:
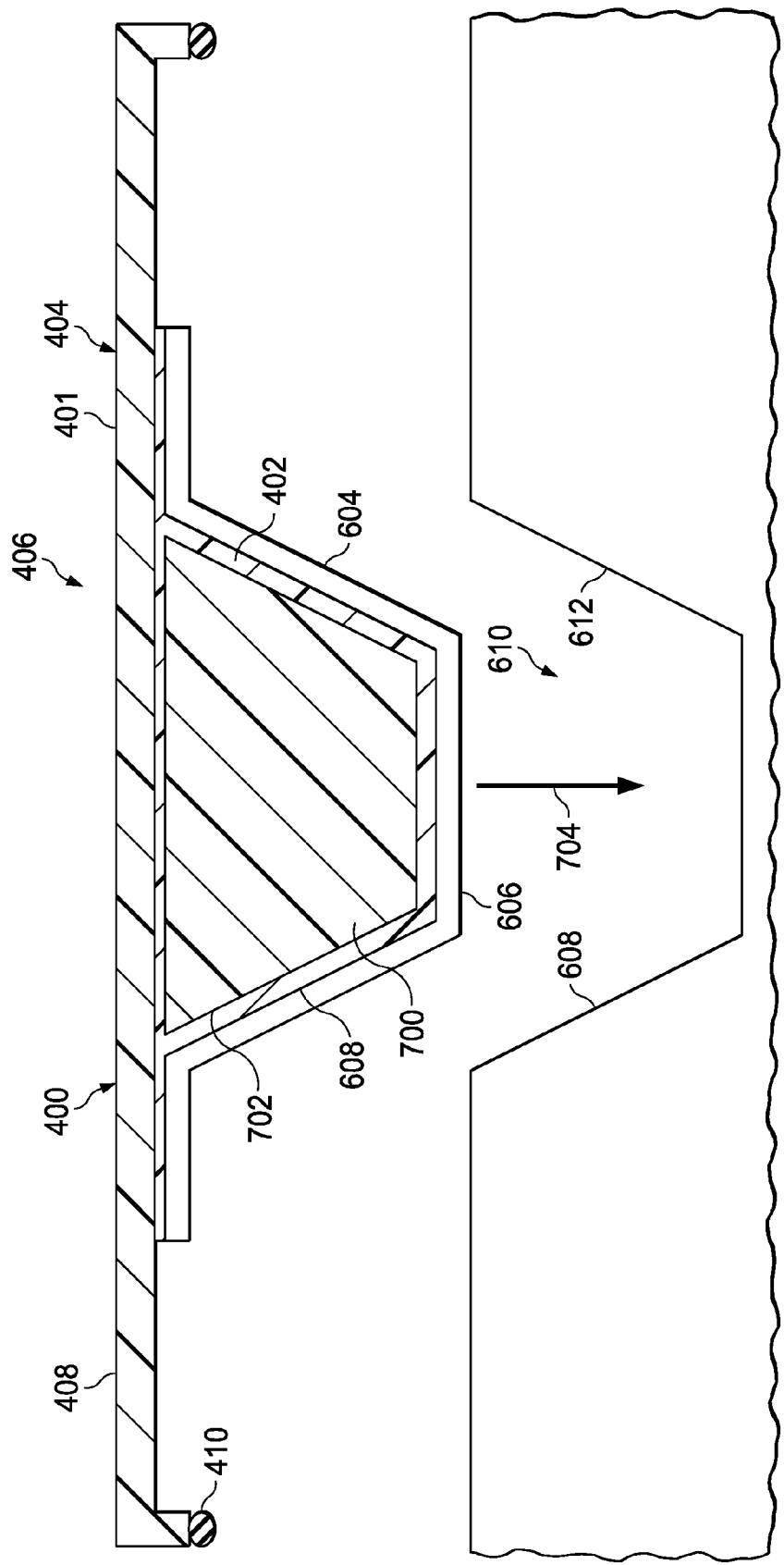
FIG. 7 is an illustration of a cross-sectional view of a stringer processing device holding a stringer preform in accordance with an illustrative embodiment.

Turning now to FIG. 7, an illustration of a cross-sectional view of a stringer processing device holding a stringer preform is depicted in accordance with an illustrative embodiment. In this example, a cross-sectional view of stringer processing device 400 with stringer preform 606 over tool 612 taken along lines 7-7 in FIG. 4 is shown. In this view of stringer processing device 400, channel 700 is seen within wall 702 of compacting structure 402.

As depicted, stringer processing device 400 with stringer preform 606 may be moved toward tool 612 in the direction of arrow 704. The movement in the direction of arrow 704 may be such that stringer preform 606 may be sandwiched between stringer processing device 400 and tool 612. In other words, compacting structure 402 moves towards surface 608 of tool 612 with layers of uncured composite material 604 in stringer preform 606 located between compacting structure 402 and tool 612 such that compacting structure 402 applies pressure to layers of uncured composite material 604.

In this illustrative example, carrier vacuum system 406 applies a vacuum to layers of uncured composite material 604 and stringer preform 606. This vacuum is applied to hold stringer preform 606 during transport and movement relative to surface 608 of tool 612.

Figure 8:
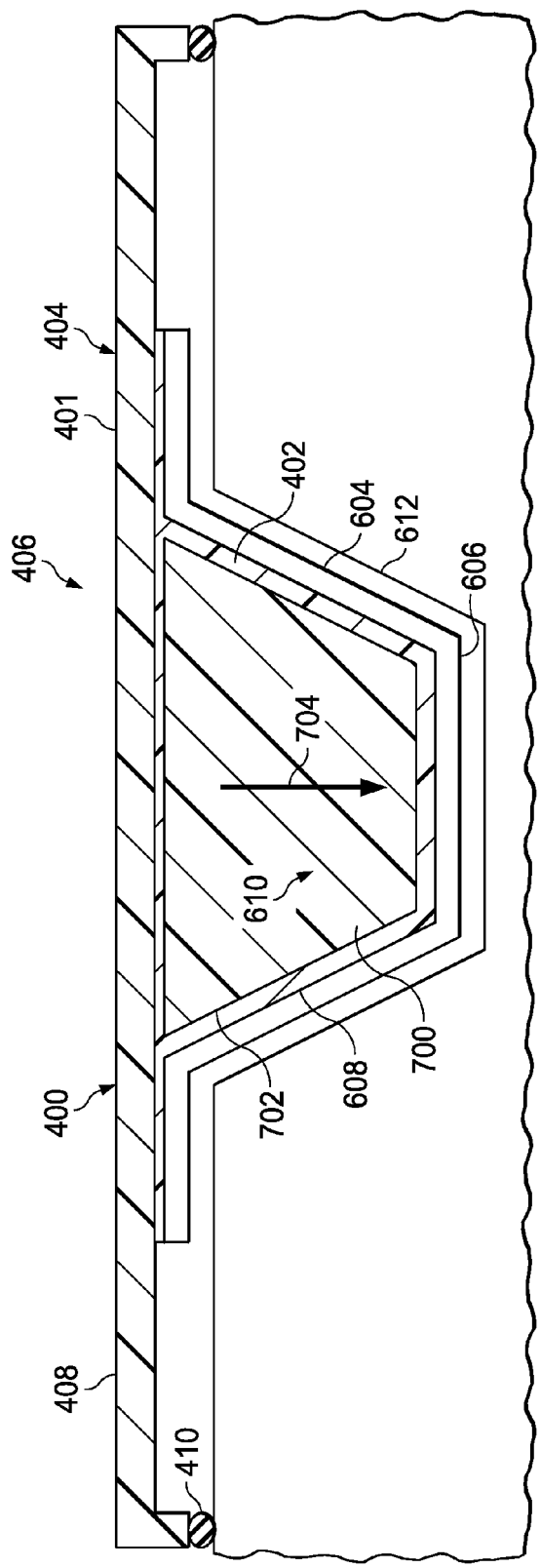
FIG. 8 is another cross-sectional view of a stringer processing device with a stringer preform in a channel of a tool in accordance with an illustrative embodiment.

Turning now to FIG. 8, another cross-sectional view of a stringer processing device with a stringer preform in a channel of a tool is depicted in accordance with an illustrative embodiment. In this view, stringer processing device 400 with stringer preform 606 has been moved into channel 610. In this position, a vacuum may be applied to compactor vacuum system 404 such that compacting structure 402 applies pressure against layers of uncured composite material 604 in stringer preform 606 in the direction of arrow 704. Layers of uncured composite material 604 are located between compacting structure 402 and surface 608 of channel 610.

Additionally, when carrier vacuum system 406 may be turned off, carrier vacuum system 406 does not apply a vacuum to layers of uncured composite material 604 in stringer preform 606. This vacuum is no longer needed to move stringer preform 606.

In this manner, layers of uncured composite material 604 may be compacted. This compacting may reduce undesired features such as voids, air pockets, wrinkles, or other undesired features in layers of uncured composite material 604. This compacting may be performed for a period of time. This period of time may be, for example, ten minutes, thirty minutes, one hour, or some other suitable amount of time.

Figure 9:
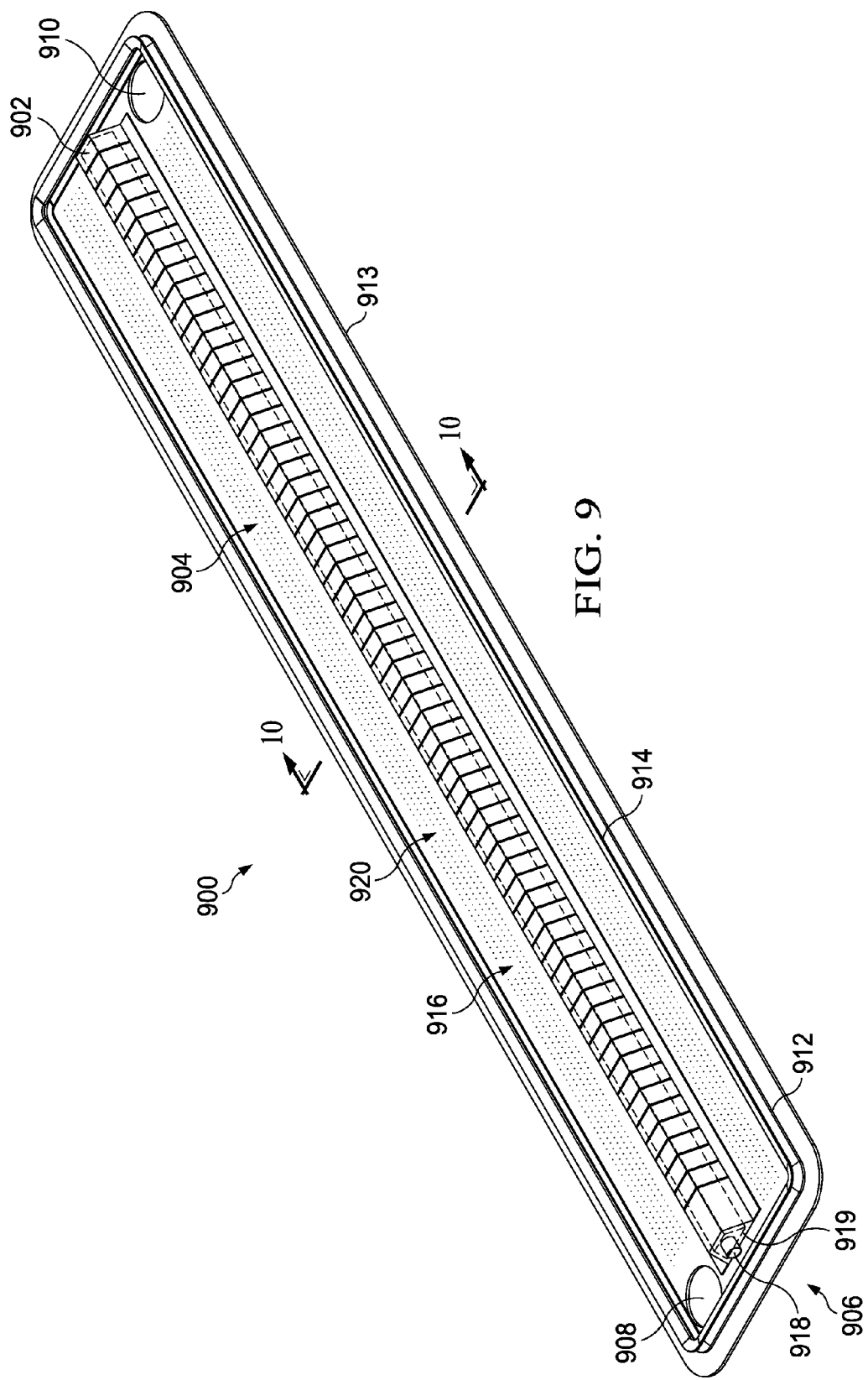
FIG. 9 is an illustration of a stringer processing device in accordance with an illustrative embodiment.

With reference now to FIG. 9, an illustration of a stringer processing device is depicted in accordance with an illustrative embodiment. Stringer processing device 900 is an example of another physical implementation for stringer processing device 300 shown in block form in FIG. 3.

As depicted, stringer processing device 900 includes compacting structure 902, compactor vacuum system 904, and carrier vacuum system 906. In this illustrative example, compactor vacuum system 904 is comprised of first port 908, second port 910, enclosure structure 912, and seal 914. As can be seen, seal 914 is located around periphery 913 of enclosure structure 912. In particular, seal 914 is not on periphery 913 in this illustrative example.

In this example, both first port 908 and second port 910 may be connected to a vacuum source in this particular example. Enclosure structure 912 defines space 916 in which a vacuum may be drawn when enclosure structure 912 with seal 914 are placed against a stringer preform.

In this illustrative example, carrier vacuum system 906 comprises third port 918, channel 919, and openings 920. In this example, channel 919 is shown in phantom as extending through the interior of compacting structure 902. As depicted, openings 920 are in communication with channel 919 within compacting structure 902.

Figure 10:
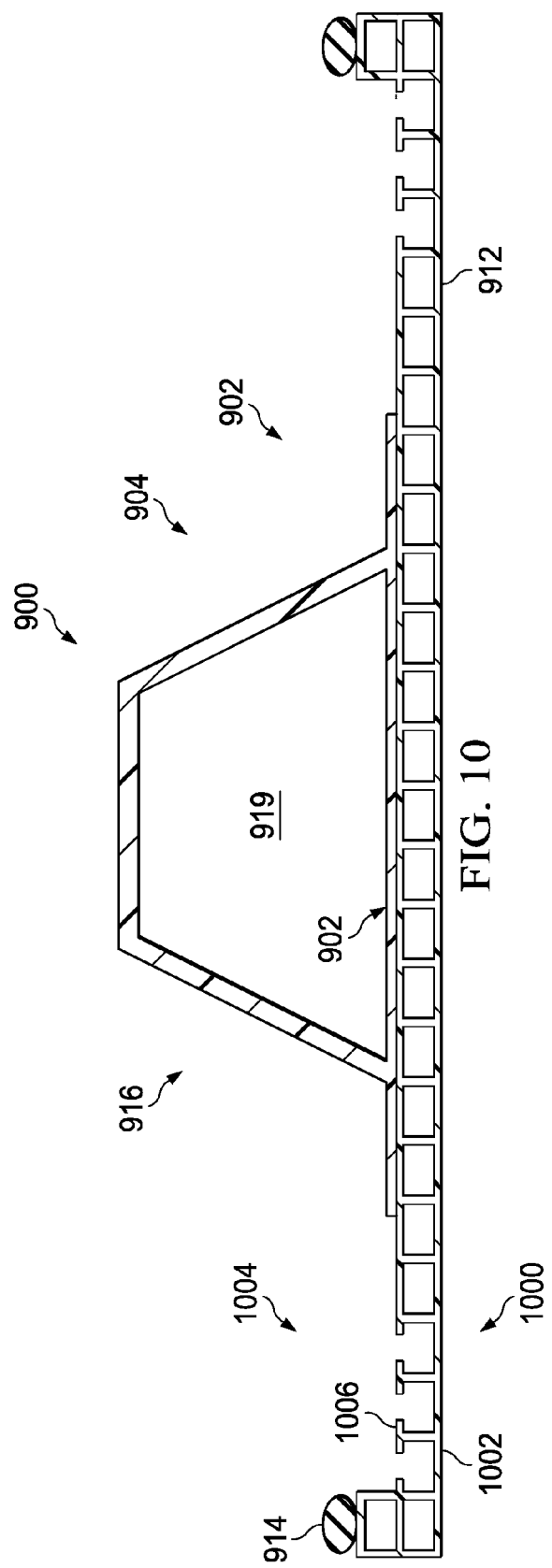
FIG. 10 is an illustration of a cross-section of a stringer processing device in accordance with an illustrative embodiment.

With reference now to FIG. 10, an illustration of a cross section of a stringer processing device is depicted in accordance with an illustrative embodiment. In this illustrative example, a cross-sectional view of stringer processing device 900 taken along lines 10-10 in FIG. 9 is shown. In this view, compactor vacuum system 904 for stringer processing device 900 is shown. Carrier vacuum system 906 for stringer processing device 900 is not seen in this view.

In this illustrative example, enclosure structure 912 for compactor vacuum system 904 is comprised of openings 1000 extending through plastic structure 1002. Openings 1004 are present on side 1006 of plastic structure 1002. Openings 1004 provide communication between openings 1000 and space 916. In this illustrative example, plastic structure 1002 may be comprised of a plastic material that is flexible.

Figure 11:
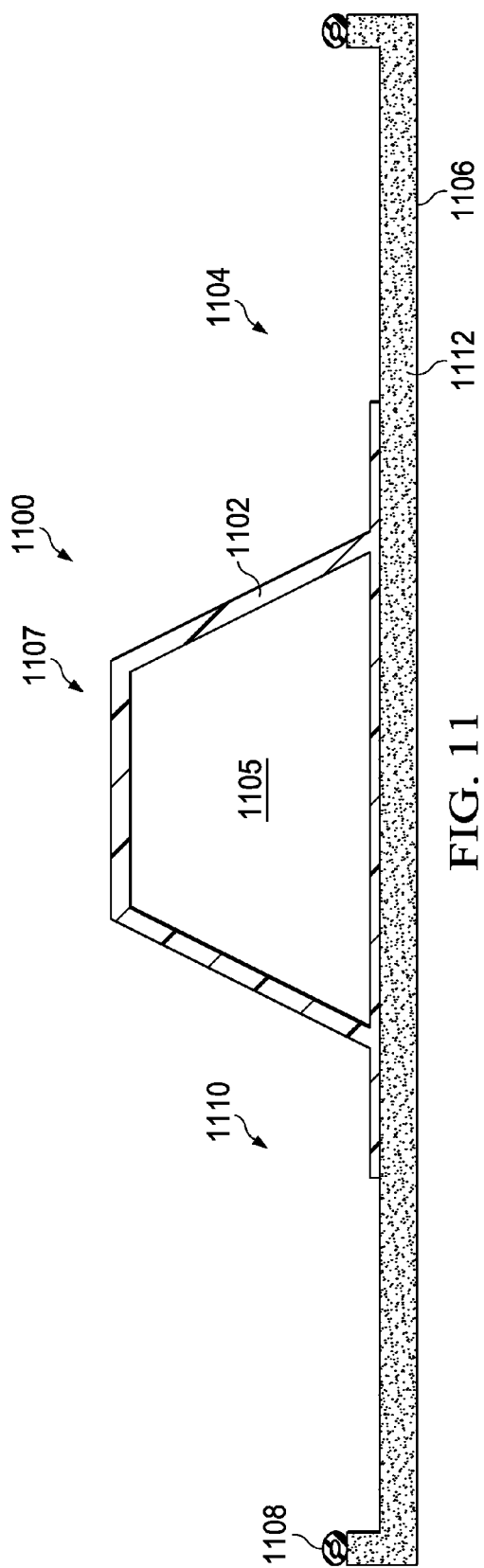
FIG. 11 is another illustration of a cross section of a stringer processing device in accordance with an illustrative embodiment.

Turning now to FIG. 11, another illustration of a cross section of a stringer processing device is depicted in accordance with an illustrative embodiment. In this illustrative example, stringer processing device 1100 is shown in a cross-sectional view. Stringer processing device 1100 is an example of a physical implementation for stringer processing device 300 shown in block form in FIG. 3.

As depicted, compacting structure 1102 is shown with compactor vacuum system 1104. Channel 1105 for carrier vacuum system 1107 is seen within the interior of compacting structure 1102 in this view. Other components for carrier vacuum system 1107 are not seen in this view.

As depicted, compactor vacuum system 1104 comprises enclosure structure 1106 and seal 1108. Enclosure structure 1106 defines space 1110.

In this illustrative example, enclosure structure 1106 is comprised of foam 1112. In particular, foam 1112 is a closed-cell foam in these illustrative examples.

Figure 12:
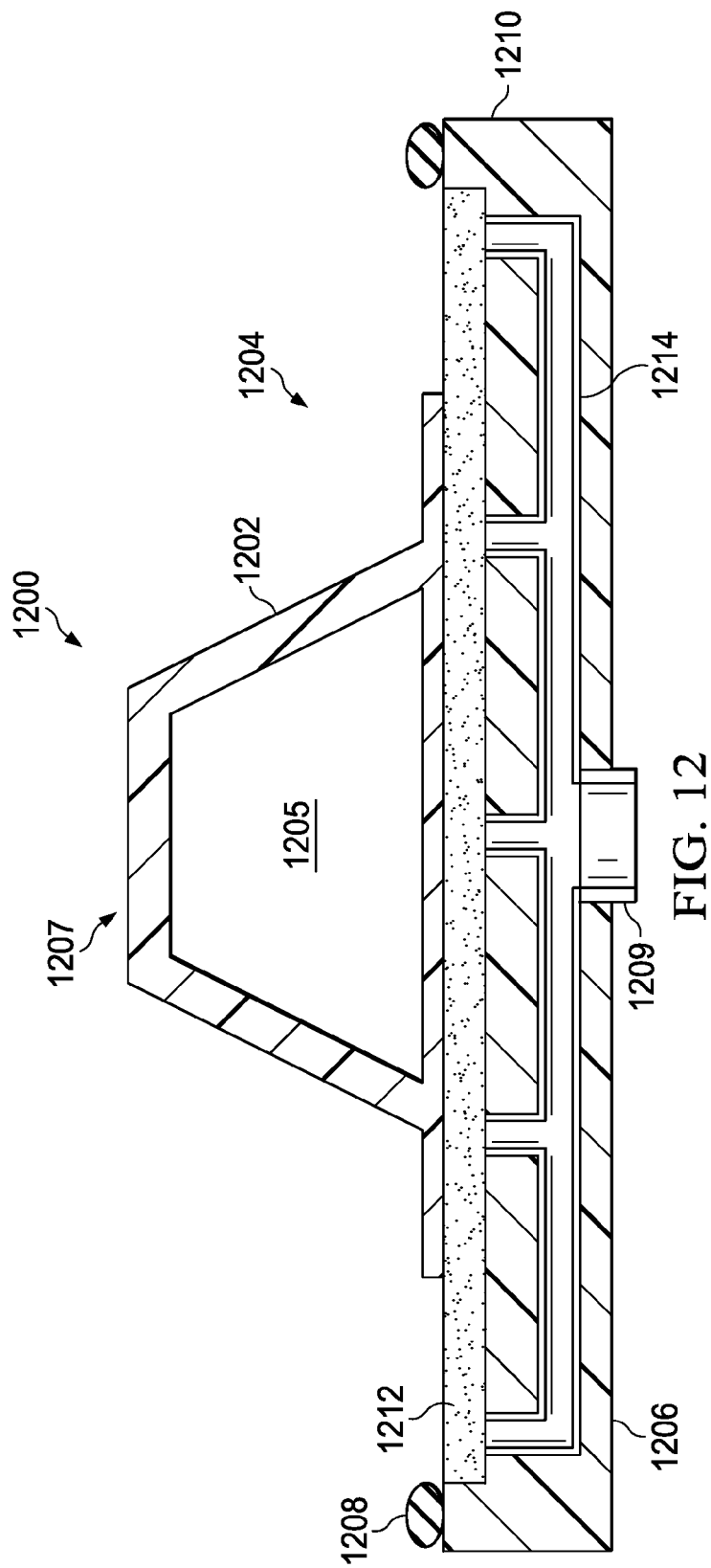
FIG. 12 is another illustration of a cross section of a stringer processing device in accordance with an illustrative embodiment.

Turning now to FIG. 12, another illustration of a cross section of a stringer processing device is depicted in accordance with an illustrative embodiment. In this illustrative example, stringer processing device 1200 is shown in a cross-sectional view. Stringer processing device 1200 is an example of a physical implementation for stringer processing device 300 shown in block form in FIG. 3.

As depicted, compacting structure 1202 is shown with compactor vacuum system 1204. Channel 1205 for carrier vacuum system 1207 is seen within the interior of compacting structure 1202 in this view. Other components for carrier vacuum system 1207 are not seen in this view. As depicted, compactor vacuum system 1204 comprises enclosure structure 1206, seal 1208, and port 1209.

As depicted, enclosure structure 1206 comprises first structure 1210 and second structure 1212. These two structures are associated with each other.

In this illustrative example, first structure 1210 is comprised of a non-porous material while second structure 1212 is comprised of a porous material. For example, first structure 1210 may be comprised of a material such as plastic, polycarbonate, or some other suitable material. Second structure 1212 may be comprised of polyurethane, foam, and other suitable materials that may be porous.

As depicted, openings 1214 extend through first structure 1210. Openings 1214 are in communication with port 1209 such that a vacuum applied to port 1209 may extend through openings 1214. The vacuum may also extend through second structure 1212 when second structure 1212 is comprised of a porous material.

Figure 13:
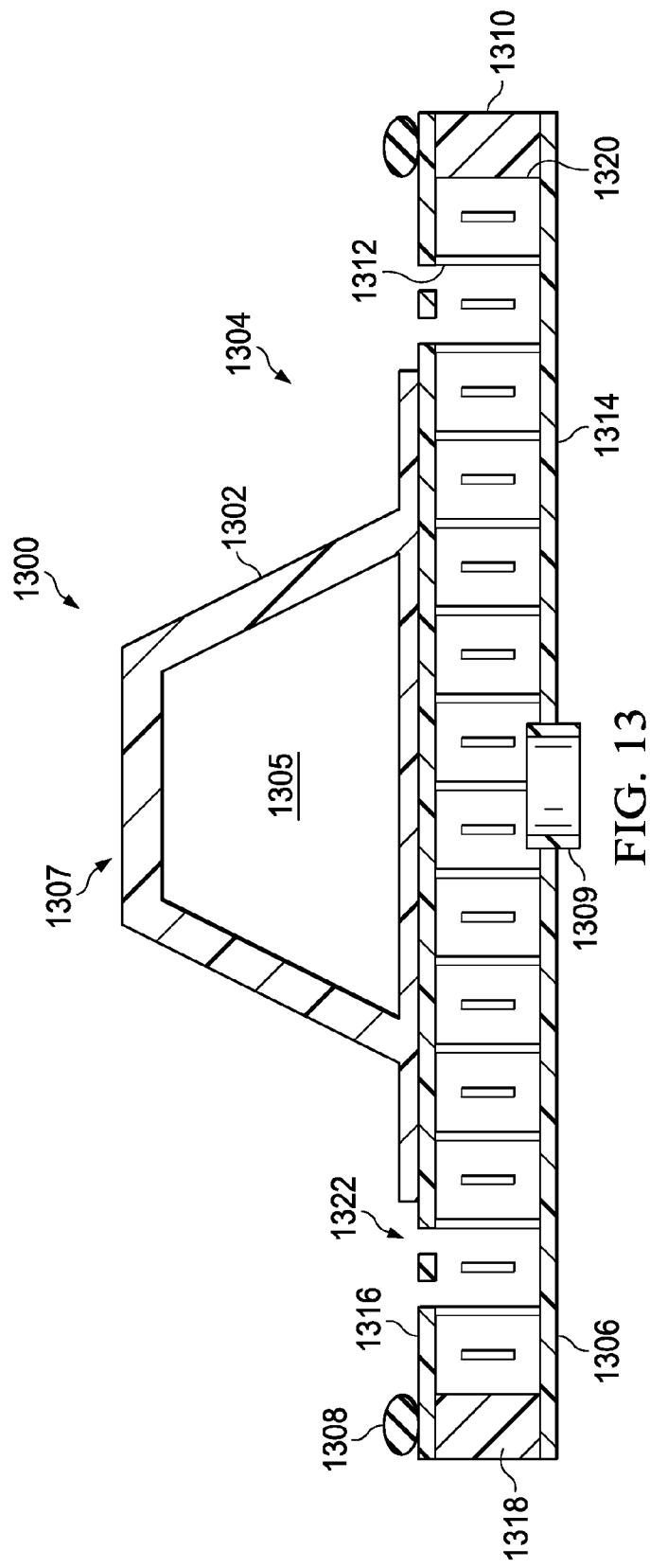
FIG. 13 is yet another illustration of a cross section of a stringer processing device in accordance with an illustrative embodiment.

With reference now to FIG. 13, yet another illustration of a cross section of a stringer processing device is depicted in accordance with an illustrative embodiment. In this illustrative example, stringer processing device 1300 is shown in a cross-sectional view. Stringer processing device 1300 is an example of a physical implementation for stringer processing device 300 shown in block form in FIG. 3.

As depicted, compacting structure 1302 is shown with compactor vacuum system 1304. Channel 1305 for carrier vacuum system 1307 is seen within the interior of compacting structure 1302 in this view. Other components for carrier vacuum system 1307 are not seen in this view. As depicted, compactor vacuum system 1304 comprises enclosure structure 1306, seal 1308, and port 1309.

As depicted, enclosure structure 1306 comprises first structure 1310 and second structure 1312. Second structure 1312 is located within first structure 1310 in this depicted example.

First structure 1310 is a solid non-porous material. Second structure 1312 is a honeycomb structure. In particular, the honeycomb structure may be a vented honeycomb structure such that different cells in the honeycomb structure have openings to other cells in the honeycomb structure.

For example, first structure 1310 may be comprised of a material such as plastic, polycarbonate, or some other suitable material. Second structure 1312 may be comprised of paper, polyurethane, plastic, or any other suitable materials that may be used to form a honeycomb structure. In these illustrative examples, port 1309 is in communication with second structure 1312.

As depicted, first structure 1310 may be comprised of first facesheet 1314, second facesheet 1316, and edge fill 1318. Edge fill 1318 is present around periphery 1320 of second structure 1312.

Openings 1322 are present in first facesheet 1314 in this illustrative example. In this manner, when a vacuum is applied to compactor vacuum system 1304, compacting structure 1302 may apply pressure to layers of uncured composite material.

Figure 14:
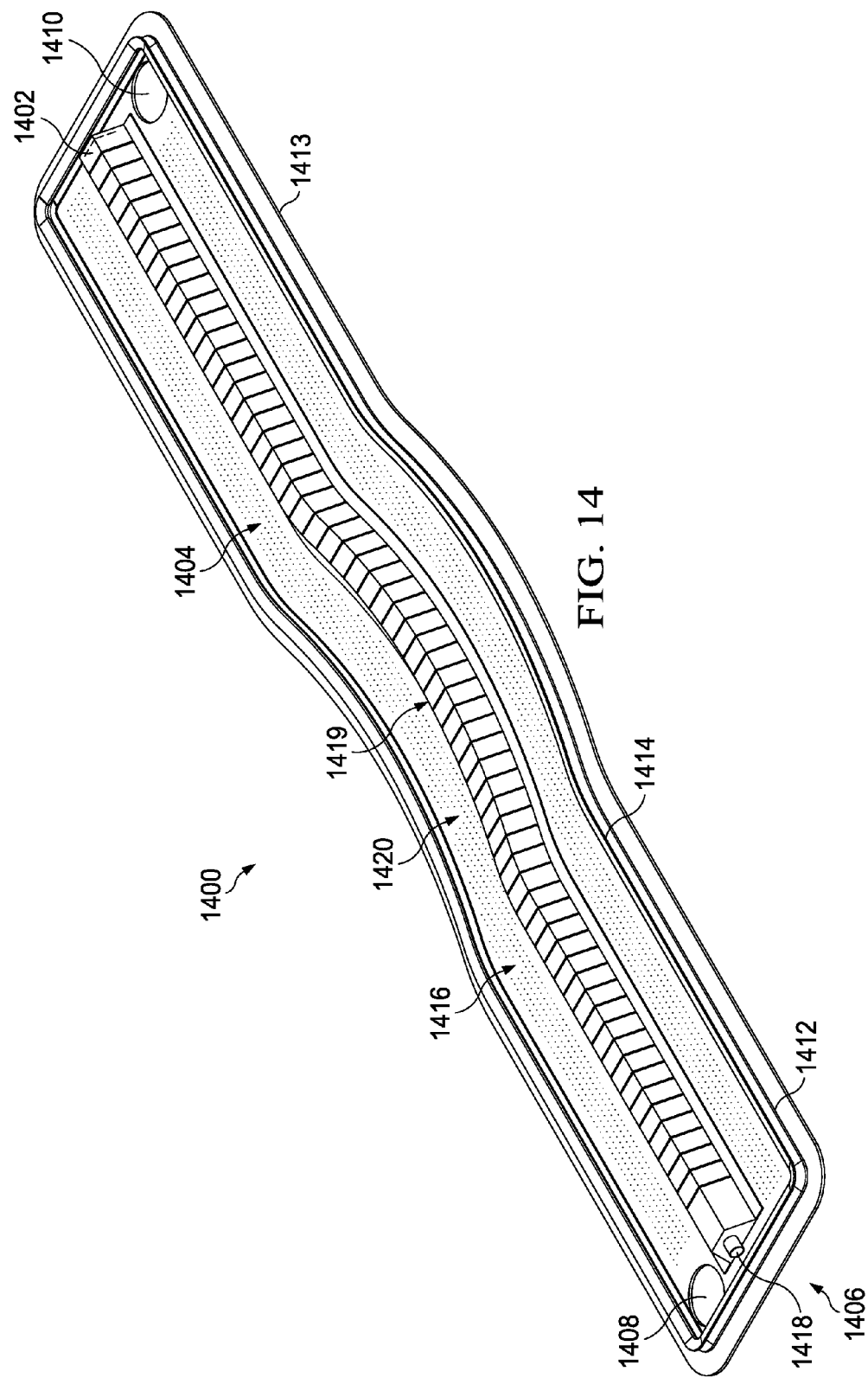
FIG. 14 is another illustration of a stringer processing device in accordance with an illustrative embodiment.

With reference now to FIG. 14, another illustration of a stringer processing device 1400 is depicted in accordance with an illustrative embodiment. Stringer processing device 1400 is an example of another physical implementation for stringer processing device 300 shown in block form in FIG. 3.

In this illustrative example, stringer processing device 1400 has a shape that corresponds to the shape of tool 204 in FIG. 2. In this manner, shape of stringer processing device 1400 may be fixed or the shape of stringer processing device 1400 may be flexible to have a shape as depicted in this example.

The materials for stringer processing device 1400 may be selected such that the different components in stringer processing device 1400 may bend such that the shape corresponds to the shape of tool 204.

As depicted, stringer processing device 1400 includes compacting structure 1402, compactor vacuum system 1404, and carrier vacuum system 1406. As depicted, the compacting structure 1402, compactor vacuum system 1404, and carrier vacuum system 1406 are flexible such that the shape of compacting structure 1402, the shape of compactor vacuum system 1404, and the shape of carrier vacuum system 1406 are configured to bend to correspond to a shape of a tool.

In this illustrative example, compactor vacuum system 1404 is comprised of first port 1408, second port 1410, enclosure structure 1412, and seal 1414. As can be seen, seal 1414 is located around periphery 1413 of enclosure structure 1412. In particular, seal 1414 is not on periphery 1413 in this illustrative example.

In this example, both first port 1408 and second port 1410 may be connected to a vacuum source in this particular example. Enclosure structure 1412 defines space 1416 in which a vacuum may be drawn when enclosure structure 1412 with seal 1414 are placed against a stringer preform.

In this illustrative example, carrier vacuum system 1406 comprises third port 1418, channel 1419, and openings 1420. In this example, channel 1419 is shown in phantom as extending through the interior of compacting structure 1402. As depicted, openings 1420 are in communication with channel 1419 within compacting structure 1402.

The illustration of stringer processing devices in FIGS. 4-14 are only provided as examples of some physical implementations for stringer processing device 300 shown in block form in FIG. 3. These different illustrations are not meant to limit the manner in which stringer processing device may be implemented. For example, the seals may be integrated as part of the enclosure structure rather than as separate structures connected to the enclosure structure as shown in the depicted examples. Further, compacting structure 1202 in FIG. 12 may have a different shape rather than the "hat" shape shown in these examples. For example, the graphite compactors may have a square shape, a rounded hat shape, an omega hat shape, or other shapes depending on the particular stringer being processed.

The different components shown in FIGS. 1 and 4-14 may be combined with components in FIGS. 2 and 3, used with components in FIGS. 2 and 3, or a combination of the two. Additionally, some of the components in FIGS. 1 and 4-14 may be illustrative examples of how components shown in block form in FIGS. 2 and 3 can be implemented as physical structures.

Figure 15:
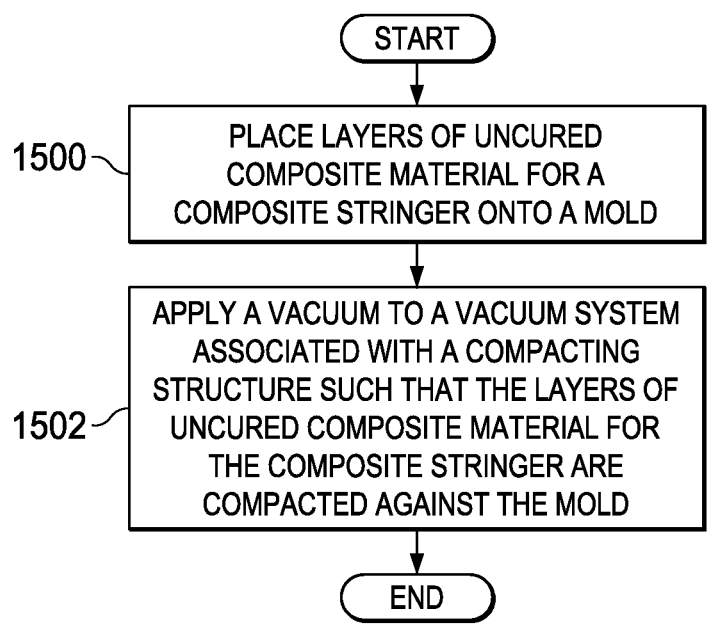
FIG. 15 is an illustration of a flowchart of a process for processing a composite stringer in accordance with an illustrative embodiment.

Turning now to FIG. 15, an illustration of a flowchart of a process for processing a composite stringer is depicted in accordance with an illustrative embodiment. The process illustrated in FIG. 15 may be implemented in composite manufacturing environment 100 in FIG. 1 and composite manufacturing environment 200 in FIG. 2.

The process begins by placing layers of uncured composite material for a composite stringer onto a mold (operation 1500). The process then applies a vacuum to a vacuum system associated with a compacting structure such that the layers of uncured composite material of the composite stringer are compacted against the mold (operation 1502) with the process terminating thereafter.

Figure 16:
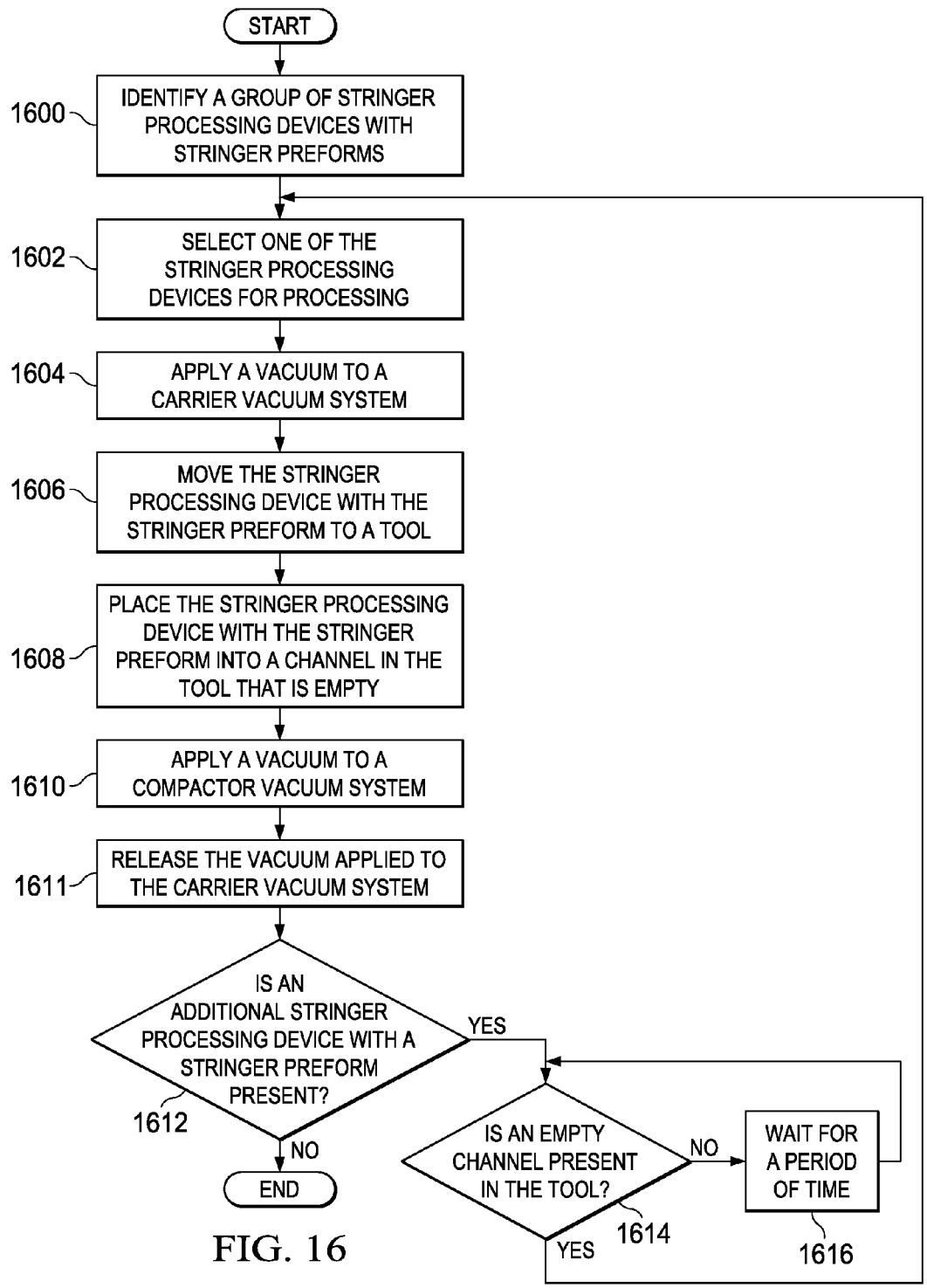
FIG. 16 is an illustration of a flowchart of a process for processing composite stringers in accordance with an illustrative embodiment.

With reference now to FIG. 16, an illustration of a flowchart of a process for processing composite stringers is depicted in accordance with an illustrative embodiment. The process illustrated in FIG. 16 is an example of a process that may be used to compact layers of uncured composite material for a stringer preform for a composite stringer. This process may be applied to multiple stringer preforms in these illustrative examples.

The process begins by identifying a group of stringer processing devices with stringer preforms (operation 1600). As used herein, a "group of" when used with reference to items means one or more items. For example, a group of stringer processing devices is one or more stringer processing devices.

In these illustrative examples, each of the other stringer processing devices has a compacting structure, a compactor vacuum system, and a carrier vacuum system. The process selects one of the stringer processing devices for processing (operation 1602).

The process then applies a vacuum to a carrier vacuum system (operation 1604). The application of the vacuum to the carrier vacuum system causes the carrier vacuum system to apply a carrier vacuum to the layers of uncured composite material. Further, the application of the carrier vacuum by the carrier vacuum system is configured to hold the layers of uncured composite material for the stringer preform against the compacting structure in the stringer processing device.

The stringer processing device with the stringer preform is moved to a tool (operation 1606). The stringer processing device with the stringer preform is placed into a channel in the tool that is empty (operation 1608). After the stringer processing device with the stringer preform is placed into the channel, a vacuum is applied to a compactor vacuum system (operation 1610). This vacuum applied to the compactor vacuum system causes the compacting structure to apply pressure to the layers of uncured composite material for the stringer preform in the mold in a manner that compacts the layers of uncured composite material. The process then releases the vacuum applied to the carrier vacuum system (operation f1611).

A determination is made as to whether an additional stringer processing device with a stringer preform is present in the group (operation 1612). If an additional stringer processing device is present, the process determines whether an empty channel is present in the tool (operation 1614). If an empty channel is present, the process returns to operation 1602. Otherwise, the process waits for a period of time (operation 1616). After the period of time passes, the process returns to operation 1614.

With reference again to operation 1612, if an additional stringer processing device with a stringer preform is not present in the group, the process terminates.

In this manner, stringer preforms may be processed as they are placed into a channel on a tool rather than waiting for multiple stringer preforms to be placed into the openings and placing compacting structures onto stringer preforms on the tool and a vacuum bag over stringer preforms and then drawing a vacuum to compact the stringer preforms. In this manner, as individual stringer preforms are compacted, those stringer preforms may be moved to another tool where compact materials may be laid up for a composite structure such as a fuselage section.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, operation 1610 and operation 1611 in the flowchart in FIG. 16 may be performed in a different order than shown. In other words, the vacuum applied to the carrier vacuum system may be released prior to applying the vacuum to the compact vacuum system after the stringer processing device with the stringer preform has been placed into the channel. In other illustrative examples, these two operations may be performed at substantially the same time.

Illustrative embodiments of the disclosure may be described in the context of aircraft manufacturing and service method 1700 as shown in FIG. 17 and aircraft 1800 as shown in FIG. 18. Turning first to FIG. 17, an illustration of an aircraft manufacturing and service method is depicted in accordance with an illustrative embodiment. During pre-production, aircraft manufacturing and service method 1700 may include specification and design 1702 of aircraft 1800 in FIG. 18 and material procurement 1704.

During production, component and subassembly manufacturing 1706 and system integration 1708 of aircraft 1800 in FIG. 18 takes place. Thereafter, aircraft 1800 in FIG. 18 may go through certification and delivery 1710 in order to be placed in service 1712. While in service 1712 by a customer, aircraft 1800 in FIG. 18 is scheduled for routine maintenance and service 1714, which may include modification, reconfiguration, refurbishment, and other maintenance or service.

Each of the processes of aircraft manufacturing and service method 1700 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 18, an illustration of an aircraft is depicted in which an illustrative embodiment may be implemented. In this example, aircraft 1800 is produced by aircraft manufacturing and service method 1700 in FIG. 17 and may include airframe 1802 with plurality of systems 1804 and interior 1806. Examples of systems 1804 include one or more of propulsion system 1808, electrical system 1810, hydraulic system 1812, and environmental system 1814. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1700 in FIG. 17. For example, stringer processing system 214 may be used during component and subassembly manufacturing 1706 to process stringer preforms. In particular, stringer processing system 214 may be used to compact stringer preforms individually. In this manner, stringer preforms may be available more quickly for use in forming stringers and for integration into other composite structures such as a fuselage section, a wing, a horizontal stabilizer, and other suitable composite structures.

Further, stringer processing system 214 also may be used to process stringers during maintenance and service 1714. For example, stringers may be processed for new composite structures that may be fabricated during maintenance, refurbishments, upgrades, and other operations. The use of a number of the different illustrative embodiments may substantially expedite the assembly of and/or reduce the cost of aircraft 1800.

Thus, the illustrative embodiments provide a method and apparatus for processing a composite stringer. In particular, one or more illustrative embodiments may be used to process layers of uncured composite material in a stringer preform for a composite stringer. In one illustrative example, a stringer processing device may be used to compact the stringer. Further, the stringer processing device also may be used to move the stringer preform to different locations.

With the use of a stringer processing system that includes stringer processing devices, the amount of time and effort needed to process composite stringers may be reduced. As a result, the amount of time needed to manufacture aircraft and structures for aircraft also may be reduced. In particular, the time and labor used to move and place vacuum bags over multiple stringers on a tool may be avoided. Instead, the stringer processing devices may be used to move and compact the layers of uncured composite material for the composite stringers.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a compacting structure having:
      a first surface;
      a second surface having a shape of one side of a composite stringer, wherein the first and second surface form an enclosure structure when the compacting structure is placed against a mold;
      a first opening in the first surface; and
      a number of second openings in the second surface;
   a compactor vacuum system associated with the first opening of the compacting structure, wherein the compactor vacuum system is configured to cause a vacuum in the enclosure structure and apply a pressure to layers of uncured composite material when a compactor vacuum is applied to the compactor vacuum system; and
   a carrier vacuum system associated with the number of second openings in the second surface, wherein the carrier vacuum system holds the layers of uncured composite material against the compacting structure while the compacting structure is positioned and placed against the mold when a carrier vacuum is applied to the carrier vacuum system.

2. The apparatus of claim 1, wherein the compactor vacuum system causes the compacting structure to apply the pressure to the layers of uncured composite material such that the layers of uncured composite material are compacted.

3. The apparatus of claim 2, wherein the compactor vacuum causes the compacting structure to apply the pressure to the layers of uncured composite material such that the layers of uncured composite material are compacted when the layers of uncured composite material are placed in the mold.

4. The apparatus of claim 1, wherein the shape of the second surface of the compacting structure corresponds to a channel in an interior of the composite stringer.

5. The apparatus of claim 1, wherein the compactor vacuum system comprises:
   a port configured to be connected to a vacuum source;
   wherein the enclosure structure is configured to cause the compacting structure to push the compacting structure towards a surface of the mold with the layers of uncured composite material located between the compacting structure and the mold such that the compacting structure applies the pressure to the layers of uncured composite material, wherein the enclosure structure is in communication with the port.

6. The apparatus of claim 5, wherein the enclosure structure is selected from one of a vacuum bag, and a flexible structure with a seal.

7. The apparatus of claim 1, wherein the carrier vacuum system is configured to hold the layers of uncured composite material against the compacting structure during movement of the compacting structure when the carrier vacuum is applied.

8. The apparatus of claim 1, wherein the carrier vacuum system comprises:
   a port configured to be connected to a vacuum source; and
   a channel extending through the compacting structure, wherein the port is in communication with the number of second openings in the compacting structure that connect the channel to an exterior of the compacting structure, wherein the number of openings is located on a portion of the compacting structure that contacts the layers of uncured composite material.

9. The apparatus of claim 1 further comprising:
   a vacuum source configured to independently apply the compactor vacuum and the carrier vacuum.

10. The apparatus of claim 1, wherein the compacting structure, the compactor vacuum system, and the a carrier vacuum system are flexible such that a shape of the compacting structure, a shape of the compactor vacuum system, and a shape of the carrier vacuum system are configured to bend to correspond to a shape of the mold.

11. The apparatus of claim 1, wherein the compacting structure is comprised of a number of materials selected from at least one of a plastic, graphite, aluminum, a polycarbonate, wood, and a composite material.

* * * * *